Figure 1:
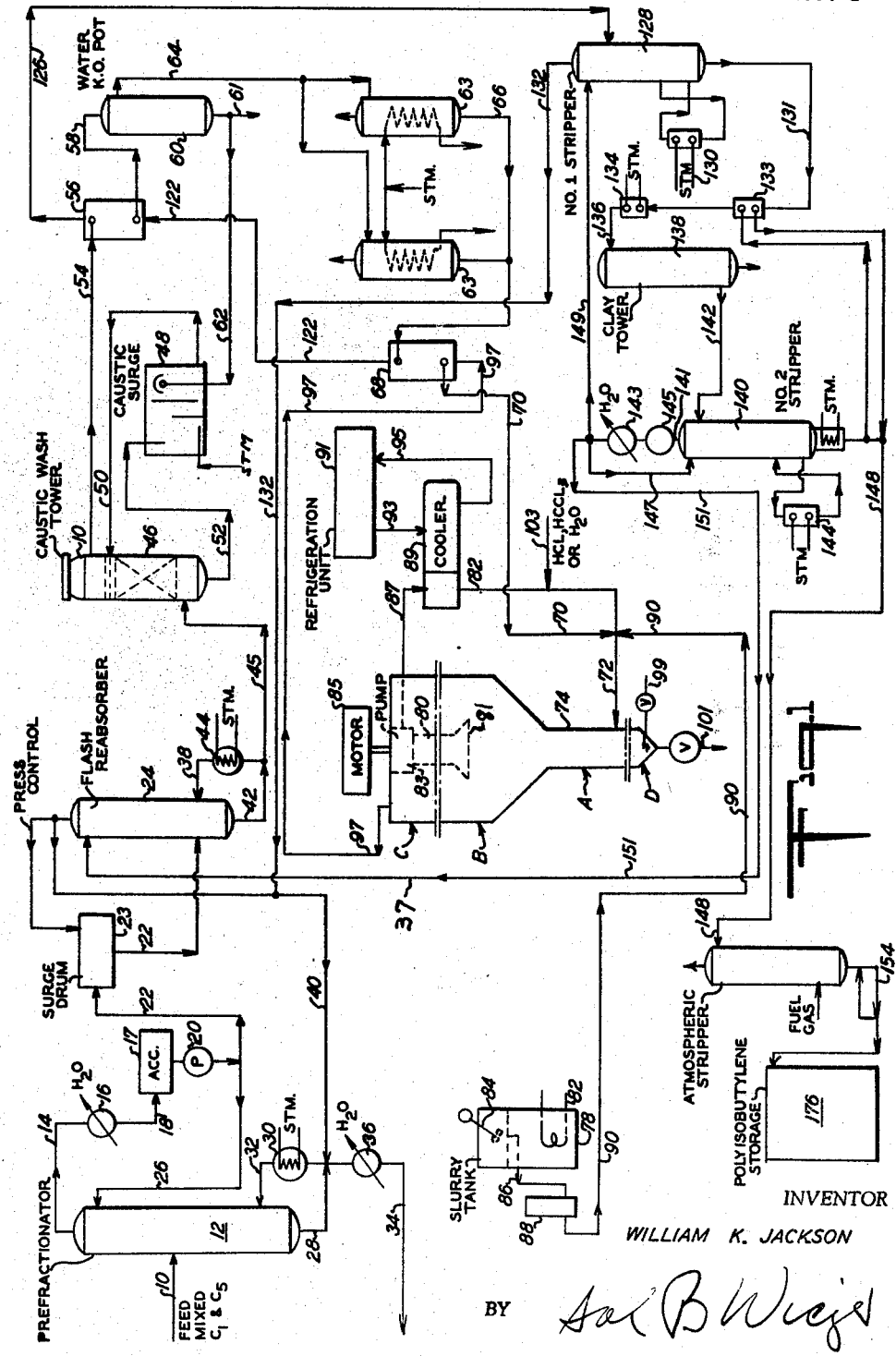

Oct. 25, 1960 W. K. JACKSON 2,957,930
PROCESS FOR THE PRODUCTION OF POLYISOBUTYLENE
Filed Aug. 27, 1956 2 Sheets-Sheet 2

INVENTOR
WILLIAM K. JACKSON

BY *Sol B. Wiget*
ATTORNEY

United States Patent Office 2,957,930
Patented Oct. 25, 1960

2,957,930

PROCESS FOR THE PRODUCTION OF POLYISOBUTYLENE

William K. Jackson, Wichita, Kans., assignor to Cosden Petroleum Corporation, Big Spring, Tex., a corporation of Delaware Filed Aug. 27, 1956, Ser. No. 606,418

11 Claims. (Cl. 260—683.15)

This invention relates to continuous production of low molecular weight liquid olefine polymers comprising predominantly polyisobutylene, from a $C_1$-$C_5$ petroleum gas feed stock containing a mixture of polymerizable olefines.

By "low molecular weight" polymers, as the term is used herein, is meant polymers having a molecular weight between about 450 and 1500, usually not exceeding about 1450, and preferably in the range of about 500 to 1000. Polymers having a molecular weight averaging about 500 have a viscosity of about 107 SSU at 210° F.; polymers averaging about 950 M.W. have a viscosity of about 3000 SSU at 210° F.; and polymers averaging about 1450 M.W. have a viscosity of about 18000 SSU at 210° F.

It is known in the art that aluminum chloride and other Friedel-Crafts type catalysts produce polyisobutylene of increasingly high molecular weight with increasingly low temperatures. For instance, solid polyisobutylene is known to be produced at temperatures as low as —148° F., at a molecular weight averaging about 100,000 in a reaction time of less than about a second. In general the molecular weight is a function of temperature, but as will appear according to the present method, catalyst size and concentration appear to influence the production of low molecular weight polymer.

The polymerization reaction is exothermic and requires for such high molecular polymer production either production batchwise, or where continuous or semi-continuous processes have been suggested in the art, processing equipment needed therefor was such as to render the procedure uneconomical. More important, such methods of the art tend to greatly reduce the catalyst activity so that the procedure either was not continuous, gave uneconomically low yields of polymer or uneconomically high consumption of catalyst. Moreover, such procedure as recommended in the prior art, either was substantially batchwise with respect to handling of catalyst with resultant decrease of activity and efficiency, or methods of handling of catalyst tended to leave the product contaminated with catalyst complexes and/or hydrochloric acid to give an inferior product. Usually the handling procedure of prior art methods directed to continuous polymer production was such as to clog the system with catalyst and polymer deposits and efforts to overcome this by reducing the quantity of catalyst tended further to render the procedure inefficient.

According to the present invention several novel procedural steps are combined for the continuous efficient production of low molecular weight polymers in a completely fluidized system. The present method includes use of a catalyst of aluminum chloride of critically adjusted particle size as to give the desired polymerizing reaction in high polymer yield in an optimum cycle for continuous rapid reaction for each pass of feed through a reactor controlled to form polymers in the desired molecular weight range. An important step of this method is to settle the catalyst substantially completely from the reaction mixture before separation of polymer from solvent comprising unreacted $C_1$-$C_5$ components. Another improved step is the maintenance of a high recycle ratio of catalyst to feed to the reactor to provide a high catalyst to polymerizable olefine ratio. A further improved step is in returning a select fraction of unreacted olefine gases in the reaction product solution to the incoming feed stock to provide for higher ultimate conversion and to adjust the composition of the raw $C_1$-$C_5$ feed stock. Because of these several improved steps, the efficiency of this method is relatively insensitive to the feed composition.

The relatively low molecular weight product continuously produced herein results from substantial selective polymerization of the isobutylene components of the $C_1$-$C_5$ feed stock in the presence of other polymerizable olefines contained in a typical low pressure petroleum refinery gas $C_1$-$C_5$ mixture. While the reaction is predominantly a polymerization of isobutylene, the very high yields available from this continuous process, ranging from about 60 to 100%, and even higher, based on the isobutylene content of the feed stock and the isobutylene content of gases leaving the reactor, suggests that some small quantity of other polymerized olefines may be present in the low molecular weight polymer produced herein.

In view of the improved recovery of polymerizable olefine stripped from the reaction product and recycled to the system the method is relatively insensitive to the actual original composition of the raw feed stock or source thereof provided, of course, that the raw feed stock contains a processable quantity of isobutylene, such as from 3 to 50% of isobutylene. Thus, any liquified $C_1$-$C_5$ petroleum gas containing such quantity of isobutylene may be used, for example, any liquified $C_1$-$C_5$ gas from any cracking process stabilizer overhead having from 3 to 50% of isobutylene therein.

The polymerizing action for continuous reaction by the present method, is regulated in the reactor to a temperature range of —45 to +60° F. and a pressure corresponding to that necessary to maintain the gas liquified in this temperature range. Usually the pressure is in the range of from 0 (atmospheric) to 50 p.s.i. gauge. Variations within this temperature range produce the variations in molecular weight and corresponding viscosity of the polymers produced in the presence of an apparent large quantity of aluminum chloride particles, about 10 to 20% by weight of the total hydrocarbon in the reaction mixture.

Prior art processes recognized the desirability of using as small a quantity of catalyst as possible. However, it was generally found necessary to use more than 1%, usually 2 to 3% of catalyst for substantial production of polyisobutylene in a reactor through which isobutylene is passed. According to the present invention while ultimate consumption of catalyst is usually less than 1% of polymer produced, it requires the continued presence of 10 to 20% of catalyst with respect to the weight of the hydrocarbons in the reactor for optimum conversion of isobutylene to polyisobutylene. In fact, applicant has found that the greater the quantity of catalyst present in the reactor, the more reliably high yields of polymer are available. At quantities substantially below 10% substantial reductions in yields of polymer are noticeable. That catalyst quantity of 10 to 20 weight percent of hydrocarbons in the reactor is in itself a large quantity, in fact, the 20% is about a maximum with respect to high fluidity of the suspension in view of the necessary high flow velocity conditions for continuous operation.

However, while this is a large quantity, it is made economically feasible in that it is made available in the reactor and maintained despite continuous flow of reaction mixture by a high recycle ratio of reactor components containing catalyst with respect to incoming raw $C_1$–$C_5$ feed stock to the reactor. Thereby, a high concentration of catalyst is maintained in the reactor while actually supplying not over 1%, and usually less, of fresh catalyst to the reacting suspension while withdrawing a similar quantity of spent catalyst from the system.

The catalyst effect of aluminum chloride to polymerize isobutylene in the feed stock passing through a reactor is a function of available catalyst surface contact with reactable isobutylene. For this reason, the high apparent concentration together with a high exposed surface area of catalyst to reactant results in the high yields of polymer with an apparent single pass through the reactor.

Accordingly, in another aspect of the present invention, the catalyst is used in a critically fine particle size ranging in particles small enough to pass a 40 mesh screen but large enough to be retained upon a 200 mesh screen. However, although the particle size may vary in this range the average size is preferably from about 50 to 100 mesh size (U.S. Standard Screen). This fine particle size of anhydrous aluminum chloride is critical for several functions. First, it is so sized as to present a maximum surface area to reactant liquefied olefine gas, particularly isobutylene, when suspended therein as a slurry. Secondly, it is so sized as to remain suspended in such slurry at a high velocity flow rate of recycle to the reactor, usually exceeding about 4 to 1 with respect to raw liquefied feed stock to the reactor. Thirdly, it is so critically sized that it will substantially entirely settle out of the liquefied gas reaction product, including unreacted liquefied gas components, when the flow velocity of the suspension is reduced to a relatively quiescent state.

Thus, according to the present invention a raw feed stock containing from 3 to 50% of polymerizable isobutylene at a temperature controlled to produce a polymer of desired molecular weight and corresponding viscosity, has added thereto anhydrous aluminum chloride to provide in the reactor a 10 to 20 weight percent quantity suspension in the liquefied hydrocarbon gas in the reactor. Reaction product solution in unreacted liquefied gas together with catalyst suspended therein, is withdrawn from the reactor as rapidly as catalyst suspension, raw feed gases and recycled suspension are passed thereto for reaction. Reaction product suspension of catalyst withdrawn from the reactor is divided. A portion corresponding to the volume of raw feed is continuously settled to remove catalyst. Another portion of the suspension is recycled to the inlet of the reactor at a rate exceeding four times and preferably exceeding about eight times the flow of raw feed gas to the reactor. That rapid and high recycle ratio increases the opportunity of surface contact of the already high concentration of the catalyst with unreacted polymerizable components of the feed stock passing into the reactor, and thereby increases the yield. That rapid recycle again serves to increase the apparent high concentration of catalyst and thereby further increases the opportunity of contact of reactable components with catalyst.

Accordingly, it is desirable to maintain the recycle rate at as high a ratio to raw feed stock as possible depending upon the capacity of the apparatus to flow and confine rapidly flowing fluid at the highest available practical velocity through the apparatus. In any case, the recycle ratio, as stated, should exceed about 4 to 1 with respect to incoming feed gas.

The reaction mixture withdrawn from the reactor first has the suspended catalyst therein settled out by passing the same through a settling zone. Such settling zone may comprise an apparatus element formed by merely increasing the diameter of the fluid duct leading from the reactor or may comprise an enlargement of the upper end of a vertical reactor. Alternately, the settling tank may be a separately large diameter tank to which the reaction fluid is passed and comprises a zone of reduced flow velocity of the suspension, the flow being reduced therein to allow substantially all of the catalyst in the above stated critical size to settle out of the reaction product. The solution of polymer in unreacted liquefied gas is further handled as a clear supernatant continuously decantable solution continuously withdrawn for purification and recovery of components. The catalyst settling out of the reaction mixture suspension, if the settling zone is part of the reactor, merely settles back into the rapidly flowing stream of withdrawn and mostly recycled reaction mixture from the upper end of the reactor. The vertical reactor may be so constructed as to provide a lowermost quiescent zone where spent catalyst sludge may be blown out of the system either continuously or intermittently as it collects.

The catalyst settled from the supernatant solution when processed in a separate settling tank is continuously recycled as suspension to the reactor from an intermediate point of the settling tank, whereby most of the catalyst is continuously returned to the reactor at the desired recycle ratio from the settling tank. Here again a lowermost quiescent zone in the settling tank will collect as spent catalyst sludge and is similarly removed from the system.

Fresh catalyst, usually less than 1% is supplied to the system with the raw feed stock and a similar quantity is withdrawn from the settling tank as spent catalyst.

It is found that after settling the substantially clear supernatant solution of polymer reaction product in unreacted $C_1$–$C_5$ liquid taken from the top of the settling tank may now be passed directly through heat exchangers for temperature adjustment of incoming liquefied $C_1$–$C_5$ feed to the reactor. That solution may also be continuously treated with clay, to remove any residual hydrochloric acid in the reactor effluent, or even any small quantity of catalyst or catalyst complexes that may remain in the solution after settling for long continuous operating periods, without clogging of the feed lines, heat exchangers or clay treaters. This is possible because the effluent from the settling tank has been so clarified of suspended catalyst of the adjusted critical particle size that great versatility in continuous operation is available. Hence the reaction product after settling may either be directly treated with clay to remove minor acid contamination and destroy acid complexes with polymer or may be first partially stripped of solvent volatiles in order to dispose of some inert solvent components and thereby reduce the quantity of fluids to be handled before clay treatment and thereafter clay treated, as desired. That combination of intermediate stripping and heat exchange is made possible only by the substantial purification of reactor effluent by the intermediate settling whereby processing lines do not become contaminated by polymer, or catalyst settling out as deposited sludge which posed the handling problems of usual polymerization processes of the prior art.

This advantage of continuous flow without contamination of equipment by sludge deposits following settling also results in part from the fact that the low molecular weight polymers produced in the present method remain soluble in the inert or unreacted $C_1$–$C_5$ hydrocarbon components of the feed stock which operate as solvents for the polymer produced. Moreover, simple heat exchange between cold reaction product and warm raw feed stock suffices to supply much of the refrigeration to feed stock as well as heat necessary to preheat the cold reaction product for subsequent distillation of more volatile inert components. Thus, great heat economy becomes available by first passing the cold catalyst free reactor effluent through heat exchange with the warm incoming feed stock passing to the reactor which warms the effluent sufficient to aid in substantial vaporization of more volatile components in a first stage stripper, the overhead gases therefrom being relatively inert, are rejected from the system and the greatly reduced volume of reaction product may then be treated with clay, passed in heat exchange again through warmer incoming feed stock, and then stripped in a second stripping still of all useful $C_1$–$C_5$ components for recycle.

The second such strip overhead contains a substantial quantity of unreacted olefines most of which makes a useful recycle product. It is used herein for rectification of raw incoming feed as absorber liquid reflux. This is effected by passing the liquefied recycle gas through an absorber unit in the system in which the useful polymerizable olefines therein are used to absorb vaporized components from raw liquefied $C_1$–$C_5$ feed stock being reboiled. The net effect is to displace by reboiling some of the more volatile components of the raw feed stock and wash the vapors produced to reabsorb useful components therein in the recycle liquid from the stripper, displacing some of its more volatile components, thereby combining useful components of the raw feed stock with the recycle stripper stock while displacing and removing from the system more volatile components from both. By this procedure a $C_1$–$C_5$ feed stock rich in polymerizable olefines, particularly isobutylene is produced as fresh feed to the reactor.

In another aspect of this invention, it is found that catalyst is readily made up and handled as a stable composition in dry liquid polymer, such as polyisobutylene as a fluid Friedel-Crafts catalyst. That polyisobutylene suspension of Friedel-Crafts catalyst, such as the aluminum chloride in controlled particle size used herein, with some heating to desired fluidity, becomes readily pumped in controlled quantity by a gear pump so that fresh catalyst comprising aluminum chloride in liquid polyisobutylene, entirely stable and inert, may be pumped to the reactor together with fresh $C_1$–$C_5$ feed stock to control the catalyst quantity. Such catalyst suspension in the low viscosity liquid final polyisobutylene reaction product as carrier, does not contaminate the reactor effluent, does not contaminate the components in the reactor, but on the contrary is a very active catalyst for the reaction, and becomes a means for feeding the catalyst in desired fluid and fine particle size form and concentration to the reactor.

Figure 2:
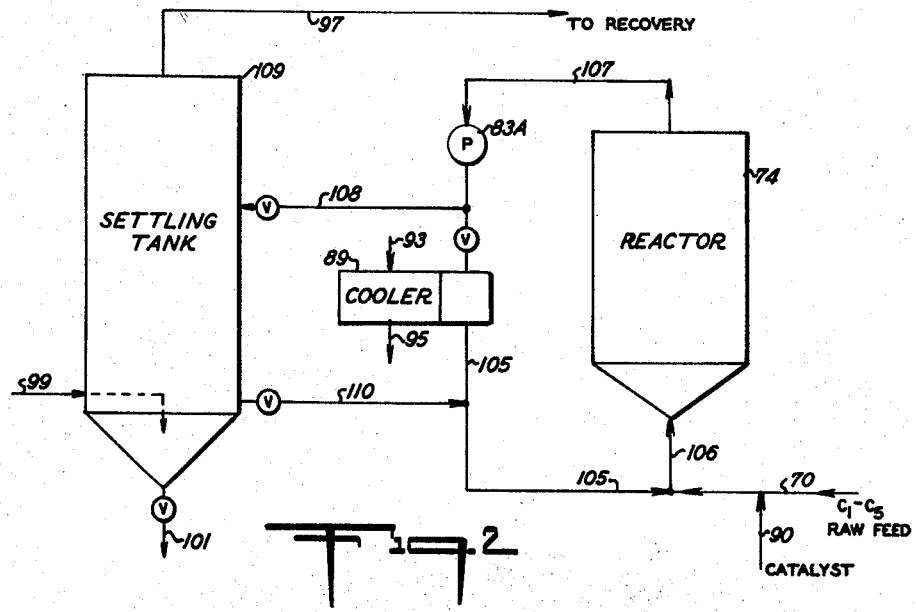

Other objects of this invention will be inherent in the ensuing description of the process and apparatus which is made with reference to the drawings in which:

Fig. 1 is a flow diagram illustrating the arrangement of apparatus elements to illustrate the process, Fig. 2 shows a modification illustrating the reactor and settling tank as separate elements.

As shown in the diagrammatic flow sheet, Fig. 1, raw petroleum gas feed comprising a $C_1$–$C_5$ hydrocarbon gas mixture under pressure sufficient to maintain the gas liquid enters the system through line 10, passing to an intermediate point of a prefractionator column 12 wherein the vapors at a temperature sufficient to vaporize $C_1$–$C_4$ components pass overhead through line 14, are condensed in a water cooled condenser 16, passing by way of line 18 through an accumulator 17, and thence to a pump 20, which forces the liquefied gas through line 22 to an intermediate point of a flash reabsorber 24. A surge drum 23 in line 22 stabilizes the pressure. A portion of the liquefied feed gas leaving pump 20 is returned through line 26 to a point near the top of the prefractionating column as reflux. In the prefractionating column 12, all of the amylenes are removed with the bottoms, which are withdrawn from the prefractionator through line 28, a portion being returned to reboiler 30 from which vapors are returned to the column by way of line 32 for regulation of the $C_5$ and higher hydrocarbon content of the bottoms. Such higher hydrocarbon content, particularly amylenes, pass out of the system with the reboiler and prefractionating column bottoms by way of line 34 after being cooled in water cooler 36. Thus, the prefractionator 12 will be operated to vaporize hydrocarbons in the $C_1$–$C_5$ range to remove all of the amylenes, leaving only a minor content of about 0.1 to 1.5 mol percent of $C_5$ in the overhead, which comprises substantially saturated $C_5$ pentanes.

In the flash reabsorber 24, liquefied vapors distilled from the final polymer product in a second stripping stage as described below, is passed as reflux from line 37 to the top of the absorber. Raw liquefied $C_1$–$C_5$ feed stock from line 22 enters the absorber 24 at a point near the lower end thereof, is mixed with relatively hot vapor effluent emitted from line 38, so that some of the raw liquefied feed is vaporized with the ascending vapors in the column. The warm vapor mixture passing upward through the reabsorber column is continuously washed by the descending stripper liquid reflux, and as a result, some of the more volatile portions of the reflux liquid is vaporized and some of the less volatile components of the ascending vapor is condensed and absorbed in the reflux liquid. Thus, both raw $C_1$–$C_5$ feed stock and less volatile portions of stripper liquid accumulate in the bottom of the absorber and combined vapors of both pass overhead of the absorber through line 40 and are rejected from the system through outlet 34 after cooling in condenser 36. The liquefied mixture of raw feed stock and recycled stripper components are withdrawn at the absorber bottom through line 42 and are passed to reboiler 44, vapors being returned to the column through line 38 and the combined hydrocarbon components comprising the adjusted feed stock continue through the system by way of line 45. Thus, in the flash reabsorber some of the more volatile components of the feed together with unreacted more volatile components of the second stage stripper are removed from the system, while polymerizable olefine components, particularly isobutylene, are increased in concentration in the liquefied feed gases which leave the flash absorber 24 through line 45. The reabsorber accordingly may be operated flexibly to adjust the boiling point range of the feed stock to whatever is desired by control of the temperature of vapors emitted from the reboiler 44 as well as the temperature of the reflux supplied to the top of the column. Thus, any proportion of the more volatile components $C_1$–$C_4$ in the feed, may be withdrawn in the reabsorber.

Sulfur in the feed gas has an adverse effect both upon the available yield and quality of the polymer. To remove sulfur, the liquefied gas is passed into the bottom of a caustic wash tower 46, counter current to a strong aqueous caustic soda solution of about 10 to 40% usually about 20% strength drawn from a caustic supply tank 48, through line 50 to the top of the tower. Thereby the liquefied feed gas is washed countercurrently with the caustic soda solution to remove sulfur, primarily lower mercaptan and hydrogen sulfide. The spent caustic solution containing the sulfur compounds is withdrawn from the tank 46 through a line 52 for caustic regeneration by blowing with steam or air in caustic tank 48.

The washed liquefied hydrocarbon feed passes out of the caustic wash tank 46, through line 54, and is cooled in a first heat exchanger 56 in heat transfer contact with cold reaction product. The liquefied feed gas then passes by way of line 58 to a water knockout pot 60 which comprises a tank in which condensed water vapor collects and is drained through line 61 or returned to the caustic tank 48 through line 62.

While a water content in excess of saturation carried as a fine suspension in the gas has no deleterious effect upon the polymerization reaction, yet at the low temperatures to which the gas may be cooled, undissolved water may freeze and thereby become a source of operating trouble by freezing in the lines and valves. Hence, it is preferred to pass the hydrated gas by way of line 64 to either of two silica gel tanks 63 which acts as a dehydrator. When one dehydrator is saturated, the flow is passed to the other while the first is being regenerated by passing hot air or steam through the silica gel to drive off the absorbed moisture.

Thereafter, the feed passes through line 66 to a second heat exchanger 68 which further reduces the temperature in heat exchange with cold reaction product, passing out of the heat exchanger through line 70 and thence, by way of line 72, into lower end of the reactor 74.

A catalyst mixture of aluminum chloride having a particle size in the range of —40 to —200 mesh is formed by adding from 5% to 40% of this aluminum chloride to dry liquid polyisobutylene, such as formed in this process. That is, the liquid carrier for the aluminum chloride is preferably a low molecular weight polyisobutylene formed under the instant polymerizing conditions. The liquid polymer is withdrawn from a storage tank 76 and mixed in a slurry mixing tank 78 with the aluminum chloride as obtained by screening of commercial ground particles.

The mixing tank 78 has heating coils 82 which may be used to heat the more viscous polymer suspensions, such as an isobutylene polymer-aluminum chloride suspension, to a pumpable viscosity. The mixture is agitated to homogeneity by an agitator 84 and the catalyst suspension is withdrawn through line 86 by gear pump 88, passing thence through line 90 to the feed input line 72 to the reactor 74. The flow rate of the fluidized catalyst is adjusted to replace the small quantity of spent catalyst withdrawn from the system and to initially impart a 10 to 20% aluminum chloride content to the hydrocarbon content in the reactor.

As shown in Fig. 1, the reactor 74 comprises a vertical column divided into three zones. The zone A is a primary reaction zone and comprises a vertical cylindrical column through which reaction components comprising raw feed gas, recycle stock and catalyst suspended therein will flow in vertical passage at a velocity at least sufficient to overcome the tendency of largest particles about 40 mesh, to settle out, and carries suspended catalyst vertically upward with the flowing fluid. Most of the polymerization reaction will take place in zone A. Zone B is a substantially widened, larger diameter intermediate portion of the vertical column disposed above the narrower diameter zone A, whereby the velocity of flow by the widened diameter begins to be reduced. That widened diameter portion B, may be 2 to 6 times the diameter of reaction portion A, whereby the velocity of flowing fluid is reduced to from one-quarter to one-thirty-sixth of the reaction zone A velocity in the smaller diameter reaction column. An offtake duct 80 of diameter about the same or slightly less than that of the reaction zone column is mounted vertically from the top of the large diameter portion of the reactor, extending downward to the middle of zone B to a flared opening 81, to take off the suspension of catalyst in reaction components from the middle of zone B as recycle. The position of the flared opening 81 within the zone B is such that the flow velocity has been reduced but not to a degree such that the catalyst will settle out, i.e. The offtake 80 therefore, is of sufficient length to intercept for offtake most of the upward flowing reaction mixture, while the catalyst suspended therein still has a positive upward flow.

In an uppermost zone C, comprising a settling zone, a clear supernatant solution of polymerized isobutylene, dissolved in unreacted feed stock, forms by settling of catalyst therefrom downward into section B. The catalyst offtake 80 is positioned well into section B to remove suspension of catalyst in reaction mixture and will pick up whatever catalyst has settled from section C. A pump 83, driven by motor 85 is mounted in the top of offtake 80 to remove the contents of the offtake 80 from the zone B at high velocity as recycle passing the same through a duct 87 to a cooler 89. The cooler 89 removes any heat of reaction released by polymerization in the reactor, returning the cooled reaction mixture by way of line 82 to line 72 for recycle to a low but intermediate point of reaction zone A of the reactor 74. The cooler 89 is refrigerated by a refrigeration unit 91, which passes refrigerant through line 93, retuning the same for recooling in the refrigeration unit by way of line 95.

The clear supernatant solution of reaction product is withdrawn from the top of the settling zone C through line 97 and conveyed for further processing in the system for heat exchange and recovery of components as will appear.

Line 72 preferably flows fluid back to the reaction column, entering the same tangentially, at a point about a foot above the bottom to allow the small quantity of heavy sludge containing spent catalyst to settle out in a relatively quiescent zone D below the reaction zone A. Periodically, or continuously, accumulated sludge in zone D is blown out of the system by passing in an inert gas into line 99, to blow accumulated sludge out through line 101. The catalyst in the accumulated sludge will be less than 1% of polymer formed. It is thereby removed from the system and replaced by fresh catalyst passed into line 72 by way of line 90. That blowdown is aqually effective by opening the valve in line 101.

The aluminum chloride catalyst is active only in the presence of hydrochloric acid gas which is injected into the system in small quantity ranging from about .08 to .12% of the catalyst in the system for activation or promotion thereof. The hydrochloric acid gas is passed into the system through line 103 from any suitable source. Actually the hydrochloric acid gas, while essential, may be provided by other means. For instance, correspondingly small quantities of water vapor or chloroform, which react with the anhydrous aluminum chloride to release hydrochloric acid, may be used as well.

In operation of the reactor as shown in Fig. 1, in which a settling zone is included as part of the construction, fresh $C_1$–$C_5$ feed stock enters the reactor by way of lines 72 and 70 and meets cold recycle stock feed line 87 through line 72, together with some fresh catalyst from line 90 and passes upward through zone A, at a velocity substantially higher than necessary to suspend the 10 to 20% catalyst therein, whereby substantial polymerization takes place in zone A. The reaction mixture passes upward through zone B whereby there is some slowing of velocity. At least 4 and usually more than about 8 times the quantity of the feed stock from line 70 input is recycled by pump 83 through line 87. In zone C the flow velocity has slowed sufficient to settle out the catalyst back to zone B for recycle, and clear supernatant reaction solution is withdrawn through line 97 at the same rate that fresh feed stock is added to the reaction mixture through line 70.

In an alternate construction shown in Fig. 2, the reactor and settling tank are formed as separate apparatus units. The $C_1$–$C_5$ feed from line 70, together with recycle from line 105 is passed to one end of the reactor 74 by way of line 106 and out of the other end of the reactor through line 107 at a velocity to maintain 10 to 20% catalyst therein in suspension. Additional catalyst may be added as before through line 90. The total effluent from the reactor drawn by pump 83A is passed in part through a line 108 to an intermediate upper portion of a settling tank 109. The larger quantity of effluent from pump 83A is cooled in cooler 89 and passed through line 105 as a recycle to line 106 to reenter the reactor. The suspension of catalyst in reaction product solution after entering the settling tank, comprising a quiescent zone, settles, and clear supernatant fluid from the top of the settling tank passes overhead in a line 97 for further purification and recovery of components. Most of the settled catalyst suspended in reaction product is returned to line 105 by way of line 110. The quantity of recycle fluid in line 105 is at least 4 times that withdrawn in line 97. Heavy catalyst sludge accumulating in the bottom of settling tank 109 is withdrawn through line 101 by intermittent or continuous blow down by gas entering through line 99.

As thus described, the reactor may be combined with a settling zone, or separate units may be provided comprising a reactor and a settling tank, the catalyst being settled in a separate apparatus element from the reaction product and thence returned to the reaction mixture as recycle. In the use of separate units, it is somewhat easier to withdraw spent catalyst from the system as shown. While the reactors shown operate with upward flow of catalyst in suspension, that upward direction of flow through the reactor is only useful to determine whether there is adequate flow velocity to maintain the catalyst suspended. It is not necessary that the reaction chamber be constructed to provide reaction in vertical flow, it is merely necessary that the catalyst remains suspended at the flow velocity. Thus any reaction chamber could be used with flow therethrough arranged for any direction, provided that adequate velocity or turbulence is available to maintain the catalyst suspended. For instance the reactor could be a chamber in which the catalyst suspension and liquefied hydrocarbon is supplied at one end and withdrawn at the other, so that the catalyst is maintained in suspension by the turbulence of the horizontal flow instead of the vertical flow described, the suspended catalyst in such case being withdrawn by setting in a separate settling tank as shown in Fig. 2. However, in any case, the desirable high recycle ratio of catalyst suspension will be maintained.

The supernatant substantially clear reaction product dissolved in unreacted liquefied gases, from which catalyst is removed by settling, continuously passes by way of line 97 through heat exchanger 68 to cool in heat exchange the incoming feed gas and becomes warmed thereby. The solution then passes through a second heat exchanger 56 by way of line 122 for further warming, passing thence through line 126 to a first stage stripper 128 wherein the liquefied gas is heated to a temperature of about 155° F. by steam coils 130 to evaporate about ⅓ to ⅔ of the inert unreacted gas, which contain the more volatile components. Such volatile overhead gas is then passed through line 132 which joins line 40, passing out of the system. The more concentrated solution of polymer in heavier unreacted liquefied gas withdrawn through line 131 is preheated in heat exchanger 133 and then further heated to a temperature 250 to 300° F. by a heater 134, passing through line 136 to the top of the clay treating tower 138, wherein some minor quantity of hydrochloric acid and polymer complexes with the acid and only trace quantities of aluminum chloride, if any, are removed by the clay treatment. The clear heavier liquefied gas solution is then passed to a second stage stripper 140 by way of line 142 heated to distill off most of the volatiles by reboiler 144. Substantially all of remaining unreacted liquefied gas solvent is vaporized from the polymer in this second stripper 140 and the distillate containing substantial quantities of polymerizable isobutylene passing overhead through line 141 is condensed by water cooled condenser 143. The stripped condensate is picked up by pump 145 and after returning a portion by way of line 147 to stripper 140 and a portion by way of line 149 to stripper 128, both as reflux, the condensate is passed by lines 151 and 37 to the reabsorber 24.

The residue, comprising liquid polymer containing a few percent of liquefied gas, withdrawn from the bottom of stripper 140, after use in heat exchanger at 133 is finally passed to an atmospheric stripper 146 by way of line 148 where it is heated to vaporize final traces of unpolymerized gas, combining the same with stripper fluid in line 151 through line 152. The liquid polymer is withdrawn at the bottom through line 154, and is sent to storage tank 76.

The following examples illustrate the practice of this invention.

*Example I*

A raw $C_1$–$C_5$ feed stock comprising cracked gases having the analysis in mol percent; ethylene, 1.0, ethane 1.04, propylene 21.23, propane 13.86, butylenes 23.55, isobutane 15.85, normal butane 7.80, amylenes 6.75, isopentane and higher 6.95, hydrogen sulfide 2.0, is depropanized before prefractionation to the following in mol percent analysis; total $C_2$ 0.04, propylene 2.15, propane 7.40, butylenes 35.50, isobutane 25.29, amylenes 9.74, isopentane and higher 8.08. It is passed to a prefractionator to remove pentanes and higher, removing all amylenes, leaving about .7 mol percent of pentane. It is then passed to the absorber simultaneously with a wash of second stage stripper stock comprising in mol percent, about 30% butene and isobutylene the balance being $C_3$ and saturated $C_4$ hydrocarbons. Volatiles are rejected in the absorber to form a final feed stock comprising in mols $C_3$ 14.73, saturated $C_4$ 122.79, butenes 55.29 and isobutylene 34.20, which is passed to the reactor at a rate of 43 gallons per minute, at a temperature of 27° F. and pressure regulated between 35 and 40 p.s.i.g. in continuous flow. At the reactor dimensions, the total feed including recycle velocity is about 20 ft. per minute through the reactor. Simultaneously, there is passed to the recator at the start of operations a 25% suspension of aluminum chloride particles screened to a particle size in the range of 45 to 150 mesh averaging about 65 mesh, U.S. Standard, until the reactor has a total content of 15.5 weight percent of aluminum chloride particles based upon the total hydrocarbon in the reactor. Simultaneously there is added to the feed of the reactor 0.12% of HCl gas, based on the total catalyst fed to the reactor. Thereafter, the catalyst flow to the reactor is reduced to merely maintain the same concentration of catalyst in the reactor. The reaction mixture in large ratio of about 8 to 1, and total quantity of 300 g.p.m. is recycled and the recycle from the reactor is continuously cooled in a cooler to withdraw the heat of reaction, returning the recycle to the feed, whereby the average temperature of 27° F. is maintained almost constant and any vapors formed are recondensed. At the flow velocity, in the reactor portion, the catalyst remained suspended and turbulently agitated. At the top of the reactor, in the expanded diameter portion of the reactor, the velocity is reduced to 2 feet per minute. The catalyst in this particle size range settles out and is withdrawn with the recycle portion taken off at the intermediate point comprising zone B described above. The recycle at 300 g.p.m. is passed to the inlet of the reactor after cooling, recooling to about 27° F. A catalyst free reaction product is withdrawn from the top of the settling chamber at the rate of 43 g.p.m., passed to a heat exchanger with incoming feed and charged to a first stripper column. Approximately 55% is taken off as overhead comprising more volatile unreacted gases which is withdrawn from the system. The concentrated first stripper solution bottoms is heated to 250–300° F. and charged to a clay treating tower. It is then passed to a second stripper column and further heated in a reboiler to 350° F. The overhead vapors from this column comprising the composition stated above, are condensed to liquid and are pumped into the absorber for adjustment of its volatility content together with that of the raw feed stock. The bottoms from this second stage stripper are charged to an atmospheric stripper where fuel gas is used to complete the stripping of the isobutylene polymer. The cooled polymer is sent to storage and is found to have an average molecular weight of about 500 and a viscosity of 107 SSU at 210° F. In continuous operation is found, at a total feed of 4750 to 4900 gals. of isobutylene per day to the reactor, 3500 to 3700 gallons of polyisobutylene of the above characteristics are produced, a yield, based upon isobutylene feed, of 74.5%. The catalyst consumed was 300 lbs. aluminum chloride per day, a consumption of about 1% of catalyst.

*Example II*

In this example, the reactor feed comprises about 3.7 mol percent of $C_3$, about 55.2 butanes, 25.3 butenes and about 15.8 isobutylene. The mixture was passed to the reactor at about 15° F., but the temperature in the reactor was adjusted to —30° F., by cooling of the recycle and a pressure of about 5 p.s.i.g. was maintained in the reactor. The total fresh feed to the reactor was 20 g.p.m. and it is recycled at a ratio of 10 to 1 with respect to this raw feed. A concentration of 18.5 weight percent of AlCl$_3$ having a particle size of between —40 and —200 mesh, of which 90% was in the range of —50 to —100 mesh was continuously maintained in the reactor. A clear solution of reaction product was continuously withdrawn from the reactor after settling out the catalyst, passed in heat exchange with incoming feed stock, clay treated at 250 to 300° F., stripped to remove about 40% of the volatiles in a first stripper, and then further stripped to remove all the remaining volatiles. The overhead condensate of the second stripper is sent to the absorber for adjustment of feed stock and recovery polymerizable components. The polymer recovered from a final atmospheric stripper had an average molecular weight of 1450 and a viscosity of 18,000 SSU at 210° F. Based on a total feed of about 2350 to 2400 gallons of isobutylene per day, a yield of 69% was obtained, with an aluminum chloride consumption of about 0.8%.

*Example III*

A fluid catalyst was made up by mixing 25 lbs. of aluminum chloride particles with 100 pounds of the polyisobutylene formed in Example I. The aluminum chloride particles had 85% particle size between 30 and 100 mesh, screened to remove particles larger than 40 mesh, all of which was retained by a —200 mesh screen U.S. Standard. The catalyst suspension is made by warming the polymer to 100° F. to reduce its viscosity while thoroughly mixing in the catalyst. It may be cooled and stored indefinitely or pumped to a reactor as described in Example I for immediate use.

As thus described, practical continuous production of polyisobutylene is made possible to produce a low viscosity liquid polymer in selected molecular weight and viscosity characteristics in the range of 500 to 1450 M.W. with a viscosity controlled to vary from 107 SSU to about 18,000. The system is improved for practical continuous operation by use of a settling stage immediately following the reactor whereby cold liquid polymer solution free of catalyst from settling is readily handled in heat exchange, and for recovery of polymer and selected fractions for recycle, whereby high polymer yields are available. The improved method is made practical for continuous polymerization by the presence of a high concentration of catalyst having a large catalyst surface recycled in high ratio to feed to increase opportunity for contact and which is critically sized for rapid continuous polymerization and for continuous settling, to produce a clear reaction product readily handled without clogging of flow lines by insoluble catalyst and polymer residues as well as complexes thereof.

An improved catalyst composition is provided whereby the catalyst becomes readily handled in a controlled particle size by blending with the polymeric reaction product, which becomes recovered in the system without contamination thereof.

Finally very high yield of low molecular weight polymer based on isobutylene fed is available in a continuous process by recovery of a selected fraction from a second stage stripper wherein the liquid polymer reaction product is recovered, returning the selected fraction to the feed stock.

Many advantages are inherent in the procedure described and in the construction shown, and certain modifications will occur to those skilled in the art whereby it is intended that the description herein be regarded as illustrative and not limiting except as defined in the claims appended hereto.

I claim:

1. The method of continuously forming low molecular weight liquid olefine polymer, consisting predominantly of polybutylenes, from a $C_1$–$C_5$ liquefied feed gas containing isobutylene, butenes and other olefines, said feed gas mixture having an isobutylene content of at least 3 percent, comprising continuously passing said liquified feed gas to the inlet end of a reaction zone at a temperature in the range of —25 to +60° F. at a liquifying pressure, simultaneously passing to said inlet end of the reaction zone a suspension of solid dry aluminum chloride particles sized in the range to pass a 40 mesh U.S.S. screen and to be retained on a 200 mesh U.S.S. screen in quantity substantially less than 1% of the hydrocarbon feed to said reaction zone and simultaneously passing to the said inlet of the reaction zone a relatively smaller quantity of a hydrochloric acid gas-forming promoter for the aluminum chloride, withdrawing the total effluent suspension of catalyst and polymeric reaction product contained in unreacted liquified hydrocarbon gases from the outlet end of said reaction zone, separating said effluent into product recovery and recycle portions, withdrawing the product recovery portion and processing the same for recovery of polymer therefrom, recycling the recycle portion to the said inlet end of said reaction zone diluting the raw feed with said recycle at a rate exceeding about 8 times the raw hydrocarbon feed to said zone and withdrawing spent catalyst sludge from the system at a rate substantially equivalent to the catalyst input to said reaction zone.

2. The method as defined in claim 1 wherein the liquified feed gas passed to said reaction zone inlet is a composite of a $C_1$–$C_5$ fraction from a petroleum refinery overhead stabilizer absorbed in heavier portions of unreacted liquified gases obtained from the outlet end of the said reaction zone, from which polymerized reaction product and catalyst has been removed, and from which the most volatile components have been stripped.

3. The method as defined in claim 1 wherein the solid aluminum chloride particles are fed to said reactor as a suspension in dry total polymer recovered as reaction product formed under the reaction conditions prevailing in said reactor.

4. The method of continuously forming low molecular weight liquid olefine polymer, consisting predominantly of polybutylenes, from a $C_1$–$C_5$ liquified feed gas containing isobutylene, butenes and other olefines, said feed gas mixture having an isobutylene content of at least 3 percent, comprising continuously passing said liquified feed gas to the inlet end of a reaction zone at a temperature in the range of —45 to +60° F. at a liquifying pressure, simultaneously passing to said inlet end of the reaction zone a suspension of solid dry aluminum chloride particles sized in the range to pass a 40 mesh U.S.S. screen and to be retained on a 200 mesh U.S.S. screen in quantity substantially less than 1% of the hydrocarbon feed, and simultaneously passing to said inlet end of the reaction zone a relatively smaller quantity of a hydrochloric acid gas-forming promoter for the aluminum chloride based upon the quantity of aluminum chloride feed, withdrawing the effluent suspension of catalyst and polymeric reaction product contained in unreacted liquified hydrocarbon gases from the outlet end of said reaction zone, separating said effluent into product recovery and recycle portions, continuously recycling the recycle portion to the said inlet end of the reaction zone, separating suspended catalyst from the product recovery portion by settling in a relatively quiescent settling zone to form a substantially catalyst-free solution of polymer in unreacted hydrocarbon and a relatively more concentrated suspension of catalyst in effluent reaction product, recycling said concentrated catalyst suspension to the said inlet end of the reaction zone, the total recycle diluting the raw feed to the said inlet end of the reaction zone exceeding about 8 times the said liquified feed gas to said inlet of the reaction zone, withdrawing spent settled catalyst sludge from the bottom of said settling zone at a rate substantially equivalent to the catalyst input to the said inlet to the reaction zone, and treating the said catalyst-free solution of polymer in unreacted hydrocarbon from said settling zone to recover the polymer.

5. The method as defined in claim 4 wherein the catalyst promoter is hydrochloric acid gas supplied in quantity of about .08 to 0.12% by weight of the aluminum chloride.

6. The method as defined in claim 4 wherein said settling zone is contiguous to said reaction zone and comprises an enlarged flow area of fluid from said reaction zone to said settling zone whereby said enlarged area reduces the flow rate to provide relative fluid quiescence in passage from one zone to the next to allow settling of catalyst from said settling zone back into said reaction zone.

7. The method of continuously forming low molecular weight liquid olefine polymer, consisting predominantly of polybutylenes, from a $C_1$–$C_5$ liquified feed gas containing isobutylene, butenes and other olefines, said feed gas mixture having an isobutylene content of at least 3 percent, comprising continuously passing said liquified feed gas to the inlet end of a reaction zone at a temperature in the range of −45 to +60° F. at a liquifying pressure, simultaneously passing to said inlet end of the reaction zone a suspension of solid dry aluminum chloride particles sized in the range to pass a 40 mesh U.S.S. screen and to be retained on a 200 mesh U.S.S. screen in quantity substantially less than 1% of the hydrocarbon feed, and simultaneously passing to said inlet end of the reaction zone a relatively smaller quantity of a hydrochloric acid gas-forming promoter for the aluminum chloride based upon the quantity of aluminum chloride feed, withdrawing the effluent suspension of catalyst and polymeric reaction product contained in unreacted liquified hydrocarbon gases from the outlet end of said reaction zone, separating said effluent into product recovery and recycle portions, continuously recycling the recycle portion to the said inlet end of the reaction zone, separating suspended catalyst from the product recovery portion by settling in a relatively quiescent settling zone to form a substantially catalyst-free solution of polymer in unreacted hydrocarbon and a relatively more concentrated suspension of catalyst in effluent reaction product, recycling said concentrated catalyst suspension to the said inlet end of the reaction zone, the total recycle diluting the raw feed to the said inlet end of the reaction zone being at least about 10 times the said liquified feed gas to said inlet of the reaction zone, withdrawing spent settled catalyst sludge from the bottom of said settling zone at a rate substantially equivalent to the catalyst input to the said inlet to the reaction zone, and treating the said catalyst-free solution of polymer in unreacted hydrocarbon from said settling zone to recover the polymer.

8. The method of preparing a $C_1$–$C_5$ feed stock for conversion in a polymerization reaction zone to low molecular weight liquid olefine polymer consisting predominantly of polybutylene, said feed stock containing isobutylene, butenes and other polymerizable olefins the isobutylene content being at least 3 percent, comprising passing a $C_1$–$C_5$ refinery gas having at least 3% of isobutylene therein to an absorber, withdrawing the reaction product of a $C_1$–$C_5$ liquified feed gas containing polymer said unreacted polymerizable olefines, other $C_1$–$C_5$ hydrocarbons and aluminum chloride particle catalyst suspension therein from the outlet end of a polymerization reaction zone, separating suspended catalyst from said reaction product solution, stripping some of the more volatile gases from said reaction product solution in a first solvent stripping stage, stripping the residual less volatile liquified $C_1$–$C_5$ solvent gases from said reaction product in a second solvent stripping stage, liquifying said less volatile unreacted gases from said second solvent stripping stage and passing the same as an absorber liquid to said absorber in washing contact to the said $C_1$–$C_5$ refinery gases therein to form a liquid absorber concentrate of liquified less volatile gases from both sources while rejecting the more volatile gases from the absorber system, and passing the rich absorber liquified $C_1$–$C_5$ gas as inlet feed gas to the inlet end of said polymerization reaction zone.

9. The method of continuously forming low viscosity liquid olefine polymer, consisting predominantly of polybutylenes, comprising commingling a gaseous $C_1$–$C_5$ petroleum refinery gas with a recycle liquified unreacted olefine-containing fraction recovered from a $C_1$–$C_5$ reacted polymer solution from a polymerization reaction zone, to form a composite $C_1$–$C_5$ liquified feed stock to said reaction zone composed preponderantly of lower volatile $C_1$–$C_5$ components and containing isobutylene together with other olefines, said feed stock having an isobutylene content of at least 3 percent, continuously passing said composite liquified feed stock, cooled in heat exchange with reacted polymer solution, to the inlet end of the reaction zone at a temperature in the range of −45 to +60° F., simultaneously passing to the said inlet end of said reaction zone, in quantity less than about 1% of the total reactor feed, an inert liquid suspension of solid dry aluminum chloride particles having a particle size adjusted to substantially completely settle out from a quiescent liquified body of $C_1$–$C_5$ gas and composed of particles in the range of 200 to 40 mesh U.S.S. screen, and simultaneously passing to the said inlet end of the reaction zone a relatively smaller quantity of hydrochloric acid gas-forming promoter for the aluminum chloride catalyst, continuously withdrawing from the outlet end of said reaction zone reacted polymeric product dissolved in liquified unreacted $C_1$–$C_5$ hydrocarbon together with dry aluminum chloride catalyst particles homogeneously suspended therein, dividing the effluent from said reaction zone into a product recovery portion and a first recycle portion, passing the product recovery portion of the effluent to a settling zone whereby to separate the same into an upper clear supernatant liquid portion comprising olefine polymer dissolved in unreacted $C_1$–$C_5$ components, an intermediate portion comprising reaction product solution having a relatively concentrated suspension of solid aluminum chloride particles therein, and a lowermost deposit of spent catalyst, continuously passing the upper clear supernatant polymer solution in the said heat exchange with the said composite $C_1$–$C_5$ liquified feed stock passing to said inlet end of the reaction zone, and then to product recovery to separate polymer from unreacted $C_1$–$C_5$ gases, simultaneously returning said intermediate portion of said settling zone and said first recycle portion of divided effluent as total recycle to said inlet end of the reaction zone, the combined recycles diluting the raw feed comprising at least 10 times the said composite $C_1$–$C_5$ liquified feed to said inlet end of the reaction zone, and withdrawing settled spent catalyst sludge from the bottom of said settling zone.

10. The method of continuously forming liquid olefine polymer consisting predominantly of polyisobutylene having a controlled low narrow range average molecular weight, from a $C_1$–$C_5$ liquified feed gas containing isobutylene, butenes and other olefines, said feed gas mixture having an isobutylene content of at least 3 percent, comprising continuously passing said liquified feed gas to the inlet end of an elongated reaction zone at a temperature in the range of −45 to +60° F. at a liquifying pressure, simultaneously passing to said inlet end of the said reaction zone a suspension of solid dry aluminum chloride particles sized in the range to pass a 40 mesh and be retained on a 200 mesh U.S.S. screen in quantity substantially less than 1% of the raw $C_1$-$C_5$ hydrocarbon feed to said reaction zone, and simultaneously passing to the said inlet of the reaction zone a relatively smaller quantity of a hydrochloric acid gas-forming promoter for the aluminum chloride, withdrawing the total effluent reaction mixture comprising the suspension of catalyst and dissolved polymeric reaction product in the unreacted liquified hydrocarbon gases from the outlet end of said reaction zone, separating said effluent into product recovery and recycle portions, processing the product recovery portion for recovery of polymer therefrom, and recycling the recycle portion to the said inlet end of said reaction zone, diluting the said raw feed with said recycle at a rate exceeding about 8 times the raw hydrocarbon feed to said inlet of the reaction zone.

11. The method of continuously forming liquid olefine polymer consisting predominantly of polyisobutylene having a controlled low narrow range average molecular weight, from a $C_1$-$C_5$ liquified feed gas containing isobutylene, butenes and other olefines, said gas feed mixture having an isobutylene content of at least 3 percent, comprising continuously passing said liquified feed gas to the inlet end of an elongated reaction zone at a moderate temperature above about −45° F. at a liquifying pressure, simultaneously passing to said inlet end of the said reaction zone a suspension of solid dry aluminum chloride particles sized in the range to pass a 40 mesh screen and be retained on a 200 mesh U.S.S. screen in a quantity substantially less than 1 percent of the raw $C_1$-$C_5$ hydrocarbon feed to said reaction zone, and simultaneously passing to the said inlet of the reaction zone a relatively smaller quantity of a hydrochloric acid gas-forming promoter for the aluminum chloride, withdrawing the total effluent reaction mixture comprising the suspension of catalyst and dissolved polymeric reaction product in the unreacted liquified hydrocarbon gases from the outlet end of said reaction zone, separating said effluent into product recovery and recycle portions, processing the product recovery portion for recovery of polymer therefrom, and recycling the recycle portion to the said inlet end of said reaction zone, diluting the said raw feed with said recycle at a rate exceeding about eight times the raw hydrocarbon feed to said inlet of the reaction zone.

References Cited in the file of this patent
UNITED STATES PATENTS

| | | |
|---|---|---|
| 1,647,446 | Wolcott | Nov. 1, 1927 |
| 2,397,945 | Burney et al. | Apr. 9, 1946 |
| 2,588,358 | Carlson et al. | Mar. 11, 1952 |
| 2,677,000 | Russum | Apr. 27, 1954 |
| 2,677,002 | Yahnke et al. | Apr. 27, 1954 |
| 2,686,210 | Kirshenbaum et al. | Aug. 10, 1954 |
| 2,691,647 | Field et al. | Oct. 12, 1954 |
| 2,755,324 | Mueller | July 17, 1956 |

UNITED STATES PATENT OFFICE
CERTIFICATION OF CORRECTION

Patent No. 2,957,930                          October 25, 1960

William K. Jackson

It is hereby certified that error appears in the above numbered patent requiring correction and that the said Letters Patent should read as corrected below.

Column 12, line 8, for "-25" read -- 45 --.

Signed and sealed this 2nd day of May 1961.

(SEAL)
Attest:

ERNEST W. SWIDER                             DAVID L. LADD
Attesting Officer                                  Commissioner of Patents

UNITED STATES PATENT OFFICE

CERTIFICATION OF CORRECTION

Patent No. 2,957,930                          October 25, 1960

William K. Jackson

It is hereby certified that error appears in the above numbered patent requiring correction and that the said Letters Patent should read as corrected below.

Column 12, line 8, for "-25" read -- -45 --.

This certificate supersedes Certificate of Correction issued May 2, 1961.

Signed and sealed this 13th day of June 1961.

(SEAL)
Attest:

ERNEST W. SWIDER                                  DAVID L. LADD
Attesting Officer                                      Commissioner of Patents